UNITED STATES PATENT OFFICE.

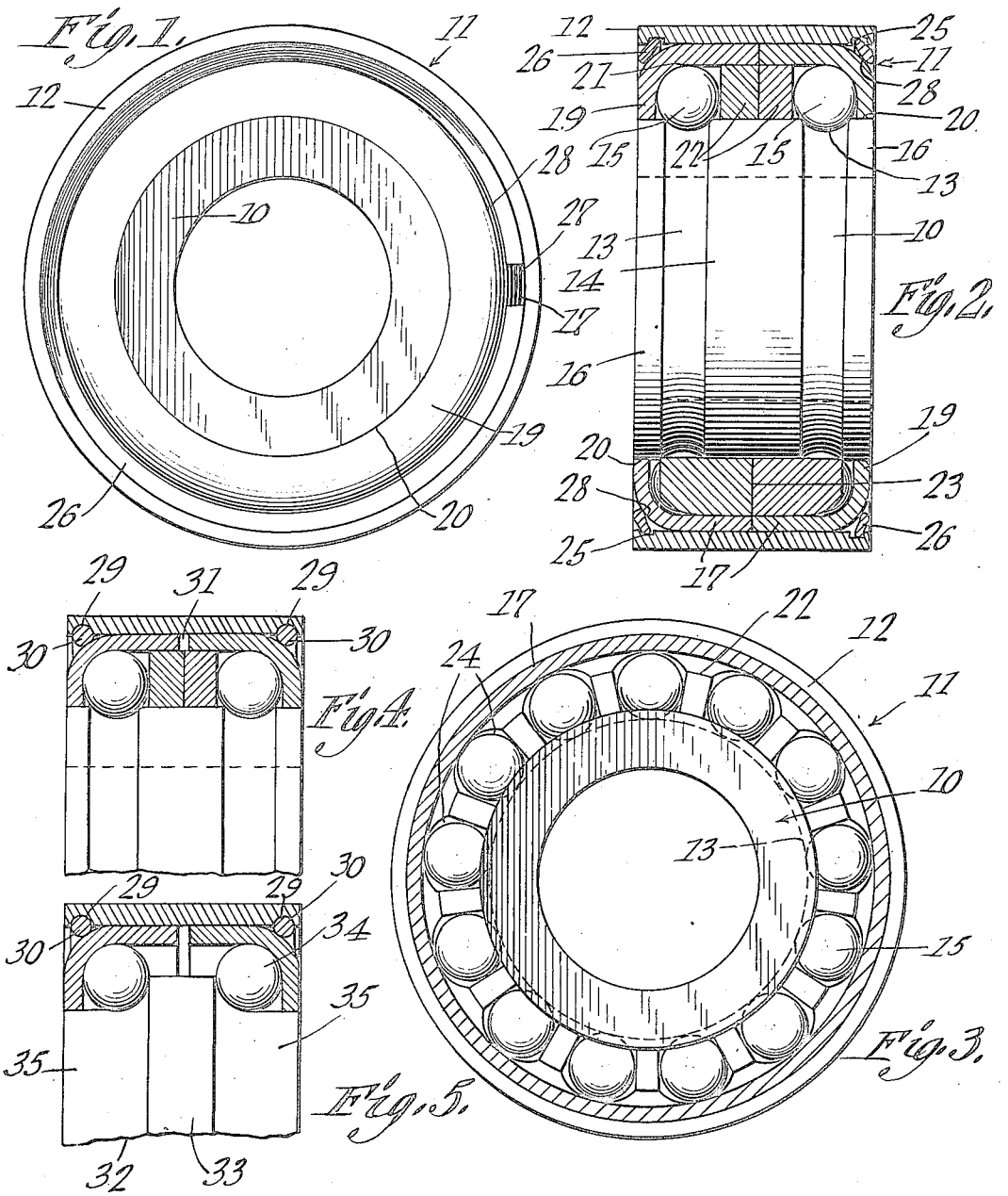

WILLIAM A. WHITNEY, OF ROCKFORD, ILLINOIS, ASSIGNOR OF ONE-HALF TO FRANK S. VANDER BOGART AND ONE-HALF TO HIRAM A. MERLIEN, BOTH OF ROCKFORD, ILLINOIS.

BALL BEARING.

1,403,367.  Specification of Letters Patent.  Patented Jan. 10, 1922.

Application filed February 24, 1920. Serial No. 360,669.

*To all whom it may concern:*

Be it known that I, WILLIAM A. WHITNEY, a citizen of the United States, residing at Rockford, in the county of Winnebago and State of Illinois, have invented a new and useful Ball Bearing, of which the following is a specification.

This invention relates to new and useful improvements in ball bearings, and the object thereof is to provide an improved and simple construction of ball bearing having novel means to retain the balls in the ball races as well as improved means for permitting the cup rings to be renewed when worn and to readily obtain access to the interior of the bearing for replacing any of the balls without destroying the casing ring, thereby greatly enhancing the commercial value and facilitating repair and lubrication of the bearing in such a manner as to greatly lengthen the life of usefulness thereof.

A further object of the invention is to provide an improved anti-friction bearing of the type employing a separator for the balls or other anti-friction members of a bearing having two rows of such balls or anti-friction members with removable cup-rings retained in position by separator rings or retainers so that the device may be readily assembled or disassembled and also, in order that the casing ring may be made of relatively soft and untempered material, while the cup-rings are made of properly tempered steel to take the strain and wear, thereby not only reducing the cost of production, but greatly facilitating the renewal of parts and decreasing the cost of upkeep.

In devices of this character, it is customary to form the outer casing of a single member, which is turned or spun inwardly at the edges, in order to retain the cup-rings of the outer race member in position, thus necessitating renewal of the entire bearing when the same became worn, owing to the inability to replace the outer casing or sleeve, that is by the user, without sending the device to the factory or making provision for the application of such casings or sleeves, as it is thought will be obvious. I am aware of the prior patents to D. F. Graham No. 1,105,132 of July 28, 1914, and No. 1,105,133 of July 28, 1914, H. Hess, No. 967,520 of August 16, 1910, and E. Rivett No. 825,418 of July 10, 1906, but none of these devices permit convenient assemblage and disassemblage of the device, in order that the cup-rings may be renewed by the user when desired or necessary, or to facilitate lubrication or repair, or even renewal of the parts, since no means is provided for detachably securing the cup-rings in position.

It is therefore the object of the invention to provide a simple device which will overcome the difficulties pointed out in connection with the referred to patents as will be hereinafter more particularly pointed out.

With the above and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:

Figure 1 is a side elevation of my improved ball bearing;

Figure 2 is a diametrical sectional view thereof across the same;

Figure 3 is a vertical sectional view;

Figure 4 is a cross sectional view similar to figure 2, but showing a modified form of retaining means for the cup-rings; and Figure 5 is a similar view of a further modification.

Referring to the drawings in detail, in which like reference characters designate corresponding parts throughout the several views, my improved ball bearing is shown as comprising an inner race member or casing 10 and an outer casing or race member 11, which includes an external sleeve or casing ring 12. The inner casing member is provided with grooves or races 13 preferably two in number and spaced apart by the intermediate annular portion 14, so as to receive the balls or ball-sets 15 of the respective two rows between said race members, which may be suitably separated as desired.

The inner casing or race member is of integral formation, so to produce outwardly of the grooves or races 13, the ribs or shoulders 16 which in conjunction with the rib or shoulder 14, serve to retain the balls in position in the races. The inner casing or race member 10 is of course in the form of an internal sleeve for engagement with a shaft or spindle, or other bearing member, as customary in the art. The outer race member includes the pair of cup-rings 17, which are fitted snugly but removably within the casing or sleeve 12, in order to contact with and retain the balls in position.

While the casing or sleeve 12 may be made of untempered or cheaper material, the cup-rings are preferably tempered steel and are disposed with their inner edges in contact, as indicated at 18 and their outer edges formed with inturned flanges or side portions 19, the cup-rings being preferably of uniform cross-section throughout the width thereof and having their inner edges 20 loosely engaging the ribs 16, grooves or races 21 being formed by the arcuately curved portions of the flanges at the outer edges of the cup-rings. By this means, the balls will conform to the surfaces of the cup-rings, thereby providing an efficient retaining means for the balls and greatly reducing the friction between the parts to permit of least possible resistance to rotation.

Also, by reason of the construction described, the strain is taken up by the inner casing and the cup-rings, without extraordinary strain on the sleeve or outer casing 12 so that the latter simply acts as a retaining means for holding the cup-rings assembled in the relation specified. The flanges formed on the cup-rings, which latter are continuously open at their inner sides so as to abut at their edges, as previously described, serve to take up end thrust, in conjunction with retainers 22 disposed in abutting relation or contact as indicated at 23 between the races and balls, and provided with the usual recesses or pockets 24 adapted to receive and rotatably retain the balls therein, to take up friction and wear between the parts. No special importance is attached to the construction of these retainers, except in combination with the cup-rings constructed and arranged as described, the retainers being of aluminum or other suitable material owing to the fact that there is no special wear thereon, and fitting between the balls to separate the latter into their respective series or sets for the purposes outlined.

In order to retain the cup-rings in position within the casing or sleeve 12, suitable means are provided, whereby said parts may be readily assembled or disassembled, and as shown in Figure 2 of the drawings, the sleeve or casing 12 is provided with undercut grooves 25 designed to receive therein, the retaining rings 26, which are preferably in the form of spring metal split retaining rings as shown, the ends thereof, being spaced apart as indicated at 27 and the same seating against the curved outer faces 28 of the cup-rings 17, which latter are preferably drawn, spun or turned in the shape illustrated and described. The grooves 25 are located near the opposed edges of the casing or sleeve at the recesses provided between the inner surfaces of the sleeve and the adjacent curved peripheral faces of the cup-rings, in order to accommodate the retaining rings 26 therein, and against displacement, and without projecting from the opposed faces of the bearing. The rings 26 are preferably of wedge-shaped cross-section, being tapered toward their outer edges as clearly illustrated in the drawings, in order that they may be readily entered into position and retained therein in use. However, the rings may be readily removed, owing to the fact that they are sprung or snapped into position as specified, in order that the parts may be readily assembled or disassembled for the purposes heretofore referred to.

In the form shown in Figure 4 of the drawings, the construction is the same, with the exception of the detachable retaining means, and in this instance, the inner surface of the sleeve or casing is provided with semi-circular grooves 29 adapted to receive the rings 30, which are of circular cross-section as shown, said rings being split rings and resiliently snapping into and out of position as aforesaid. It is to be understood that the separated ends of the rings will permit the insertion of a suitable sharp instrument beneath the same, in order that said rings may be removed. By this means, the device may be readily assembled or disassembled, in order to remove and repair or renew the parts, thus permitting any one unskilled in the art to repair and maintain the bearing in a proper condition. Also, it will be understood that this may be accomplished, without the necessity of returning the bearing to the factory, or providing special machinery with which to produce and apply the outer casing or sleeve, in assembling the parts, owing to the fact that as heretofore constructed, it was necessary to destroy the outer casing or sleeve, in the event of taking the device apart, thus resulting in a considerable number of bearings being thrown aside when they might have been reused were the same constructed in accordance with the present invention, thereby increasing the cost of maintenance.

While I have shown and described the form of the invention which embodies the principal application of the device, I desire to have it understood that such construction is merely illustrative and that various changes in the specific embodiments illustrated and described, may be made within the scope of the invention without departing from the spirit thereof as will be defined by the claim to be hereinafter appended. It is also to be understood that the ribs or shoulders 16 may be omitted, as well as the abutting retainers, the central rib 14 serving as a spacing means between the balls which are retained in position in the manner shown and described.

In Figure 4 of the drawings the cup-rings are shown spaced apart at their inner edges or ends as indicated at 31 but it is to be understood that the spacing means formed by the retainers may serve to hold said edges spaced apart or to permit them to contact if desired. In Figure 5 of the drawings, the same construction is illustrated except that the retainers are omitted and in lieu thereof, the race or bearing member 32 is provided with a peripheral rib 33 forming a spacer for the anti-friction members or balls 34 and instead of providing the ribs or shoulders 16, the ends of the race member or inner bearing member 32 are made smooth or of the same diameter as indicated at 35 for contact with the inner edges of the cup-rings. The parts being held in assembled relation by the rings 30 as described in connection with Figure 4, an efficient bearing is produced even though the retainers are omitted.

Having thus described my invention what I claim is:

In a device of the class described, an inner race member; cup rings about the inner race member, the rings having inwardly projecting flanges and having internal and external curved surfaces at the places of juncture between the body portions of the rings and the flanges; a sleeve surrounding the cup rings and provided with internal grooves adjacent to its ends; spring rings seated in the grooves and bearing on the external surfaces of the cup rings; and anti-friction elements disposed between the inner race member and the cup rings and cooperating with the internal curved surfaces of the cup rings.

In testimony that I claim the foregoing as my own, I have hereto affixed my signature in the presence of two witnesses.

WILLIAM A. WHITNEY.

Witnesses:
H. E. SHUMWAY,
H. A. MERLIEN.